United States Patent
Kubo

(10) Patent No.: US 10,259,267 B2
(45) Date of Patent: Apr. 16, 2019

(54) PNEUMATIC TIRE FOR MOTORCYCLE

(71) Applicant: BRIDGESTONE CORPORATION, Chuo-ku, Tokyo (JP)

(72) Inventor: Yukihiko Kubo, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 446 days.

(21) Appl. No.: 14/139,200

(22) Filed: Dec. 23, 2013

(65) Prior Publication Data

US 2014/0174616 A1    Jun. 26, 2014

(30) Foreign Application Priority Data

Dec. 26, 2012  (JP) ................................ 2012-282679

(51) Int. Cl.
*B60C 11/00* (2006.01)
*B60C 9/28* (2006.01)

(52) U.S. Cl.
CPC ........ *B60C 11/0075* (2013.01); *B60C 11/005* (2013.01); *B60C 9/28* (2013.01); *B60C 2011/0025* (2013.01); *B60C 2011/0033* (2013.01); *B60C 2200/10* (2013.01)

(58) Field of Classification Search
CPC ... B60C 11/0075; B60C 11/005; B60C 11/00; B60C 2011/0025; B60C 2011/0033; B60C 9/28
See application file for complete search history.

(56) References Cited

U.S. PATENT DOCUMENTS

| | | | | |
|---|---|---|---|---|
| 4,945,964 | A | * | 8/1990 | Takiguchi ............. B60C 1/0016 152/209.5 |
| 2008/0216930 | A1 | * | 9/2008 | Valentine ................ B60C 11/00 152/209.5 |
| 2012/0118462 | A1 | * | 5/2012 | Segawa ................... B60C 11/00 152/450 |

FOREIGN PATENT DOCUMENTS

| | | | |
|---|---|---|---|
| CN | 101920633 A | | 12/2010 |
| JP | 49-080703 | * | 3/1974 |
| JP | 61016105 A | | 1/1986 |
| JP | 3169713 A | | 7/1991 |
| JP | 796711 A | | 4/1995 |

(Continued)

OTHER PUBLICATIONS

Definition of Adjacent, accessed from http://www.dictionary.com/browse/adjacent on Sep. 9, 2016.*

(Continued)

*Primary Examiner* — Steven D Maki
*Assistant Examiner* — Philip N Schwartz
(74) *Attorney, Agent, or Firm* — Sughrue Mion, PLLC

(57) ABSTRACT

A pneumatic tire for a motorcycle that secures durability while improving grip performance in turning. A pneumatic tire for a motorcycle including a belt containing a belt layer formed by coating a plurality of cords with rubber in a tire tread, wherein the tread is provided with cushion rubbers separated from each other in the tire widthwise direction in both sides of the tire equatorial plane by a separated region and located outward in the tire radial direction from the belt, and a base rubber having a modulus higher than those of the cushion rubbers located in the separated region or outward in the tire radial direction therefrom, and Wn, a length of the separated region, and Wb, a length of the base rubber in the cross section in the tire widthwise direction, satisfy the relation: $Wn \leq Wb$.

5 Claims, 4 Drawing Sheets

(56) References Cited

FOREIGN PATENT DOCUMENTS

| | | | | |
|---|---|---|---|---|
| JP | 10297214 A | * | 11/1998 | |
| JP | 1170804 A | | 3/1999 | |
| JP | 2002059709 A | * | 2/2002 | ........... B60C 11/005 |
| JP | 2003515487 A | | 5/2003 | |
| JP | 2007106371 A | | 4/2007 | |
| JP | 2007125988 A | | 5/2007 | |
| JP | 2008143319 A | | 6/2008 | |
| JP | 2010126004 A | | 6/2010 | |
| JP | 2012025317 A | | 2/2012 | |
| WO | 2007/058116 A1 | | 5/2007 | |

OTHER PUBLICATIONS

Machine translation of JP10-297214 (no date).*
Machine translation of JP49-080703 (no date).*

* cited by examiner

PNEUMATIC TIRE FOR MOTORCYCLE

CROSS-REFERENCE TO RELATED APPLICATION

This application claims priority to and the benefit of Japanese Patent Application No. 2012-282679 filed Dec. 26, 2012, the entire contents of which are incorporated herein by reference.

TECHNICAL FIELD

The present invention relates to a pneumatic tire for a motorcycle that secures durability as well as improves grip performance in turning.

BACKGROUND ART

Nowadays, racing motorcycles have been required to improve power output and/or the maximum speed thereof. Therefore, motorcycles sometimes load engines capable of generating larger torque.

In this context, tires to be mounted on racing motorcycles are required to have durability against high-speed running as well as grip performance in turning.

For instance, Patent Document 1 discloses a pneumatic tire for a motorcycle that improves durability and partially enhances grip performance in turning.

CITATION LIST

Patent Document

PTL 1: WO2007058116A1

SUMMARY OF INVENTION

Technical Problem

However, although the aforementioned conventional pneumatic tire for a motorcycle can improve durability of a tire, it cannot sufficiently improve grip performance in turning of a tire.

Therefore, it is one aspect of the present invention to provide a pneumatic tire for a motorcycle that secures durability as well as improves grip performance in turning.

Solution to Problem

The inventors have tried to provide cushion rubbers having modulus lower than that of a tread rubber located outward in the tire radial direction from a belt, between the belt and the tread rubber to improve grip performance in turning of a tire.

The aforementioned tire provided with the cushion rubbers has caused changes in shear deformation of a tread, resulting in the improved grip performance in turning of a tire. In addition, since the cushion rubbers deform more easily compared with the tread rubber, heat generation in the tread has thus increased. In particular, a center side region of the tread has been found to have higher heat storage property compared with shoulder side regions.

Therefore, if the cushion rubbers are provided all over the tread region in the tire widthwise direction, rubber deformation increases in the center side region where heat storage property is higher, which will progress heat storage in this region. It has been found that the heat storage causes deterioration of rubber, whereby results in degrading tire durability.

In view of the aforementioned, the inventors have conceived of limiting the region of a tread where the cushion rubbers are provided to a part of the tread region in relation to the tire widthwise direction, and thereby have achieved the present invention.

A summary of the present invention is as follows:

The pneumatic tire for a motorcycle according to the embodiment of the present invention is a pneumatic tire for a motorcycle comprising a belt containing a belt layer formed by coating a plurality of cords with rubber in a tire tread, wherein the tread is provided with cushion rubbers separated from each other in the tire widthwise direction in both sides of the tire equatorial plane by a separated region and located outward in the tire radial direction from the belt, and a base rubber having a modulus higher than those of the cushion rubbers located in the separated region of the cushion rubbers (hereinafter, "the cushion rubber separated region") or outward in the tire radial direction therefrom, and Wn, a length of the separated region (hereinafter, the "cushion rubber separation length") and Wb, a length of the base rubber in the cross section in the tire widthwise direction, satisfy the relation: $Wn \leq Wb$.

The pneumatic tire for a motorcycle according to the embodiment of the present invention is capable of suppressing rubber deterioration caused by heat thereby securing tire durability in the center side region where the cushion rubbers are not provided, whereas capable of improving grip performance in turning of a tire in the shoulder side regions.

It should be noted herein that the term "modulus" refers to a modulus of repulsion elasticity measured by Lupke Rebound Resilience Test in accordance with JIS K6255-1996. In addition, the term "Wb, a length of the base rubber in the cross section in the tire widthwise direction" refers to a length measured along the base rubber, and the term "Wn, cushion rubber separation length in the cross section in the tire widthwise direction" refers to a length measured along the belt. Furthermore, a variety of dimensions of the pneumatic tire according to the present invention refers to dimensions of a tire mounted on an applicable rim under a predetermined air pressure and no-load, unless otherwise noted. The term, "applicable rim" refers to a rim as defined according to a valid industrial standard for the region where tires are produced or used, such as the "JATMA (Japan Automobile Tire Manufactures Association) Year Book" in Japan, the "ETRTO (European Tyre and Rim Technical Organisation) Standard Manual" in Europe, and the "TRA (The Tire and Rim Association Inc.) Year Book" in the United States. Also, the term, "predetermined air pressure" refers to an air pressure (the highest air pressure) corresponding to a predetermined load for a pneumatic tire having an applicable dimension, and the term, "predetermined load" refers to the maximum load of a tire as defined according to the above mentioned standards such as JATMA, etc.

In the aforementioned pneumatic tire for a motorcycle, the Wn and the Wb may satisfy the relation: $0.2 \leq Wn/Wb \leq 0.8$. Defining Wn/Wb as in the range described above can secure improvement of grip performance in turning of a tire as well as can easily secure durability of a tire.

In the aforementioned pneumatic tire for a motorcycle, L1, a length between the outermost end of the belt in the tire widthwise direction (hereinafter, "widthwise outermost end of the belt") and the outermost end of one of the cushion rubbers in the tire widthwise direction (hereinafter, "widthwise outermost end of the cushion") (hereinafter, "length between the widthwise outermost end of the belt–the widthwise outermost end of the cushion") may be 0.1 Wr or less, where Wr is a length of the belt, in a cross section in the tire widthwise direction. Defining the length between the widthwise outermost end of the belt–the widthwise outermost end of the cushion as in the range described above can further improve grip performance in turning of a tire.

It should be noted herein that the term "Wr, a length of the belt, in the cross section in the tire widthwise direction" refers to the longer of a length of circumferential belt layer and a length of widthwise belt layer, and a length of each belt layer is measured along its own belt layer, respectively. Furthermore, the term "widthwise outermost end of the belt" refers to the end located in the outerside in the tire widthwise direction of the outermost end in the tire widthwise direction of the circumferential belt layer and the outermost end in the tire widthwise direction of the widthwise belt layer.

In the aforementioned pneumatic tire for a motorcycle, L2, a length between the tread ground-contact end and the widthwise outermost end of the cushion (hereinafter, "length between the tread ground-contact end–widthwise outermost end of the cushion") may be 0.1 Wt or less, where Wt is a length between the tread ground-contact ends, in the cross section in a tire widthwise direction. Defining the length between the tread ground-contact end–widthwise outermost end of the cushion as in the range described above can further improve grip performance in turning of a tire.

It should be noted herein that the term "tread ground-contact ends" refers to both edges in the tire widthwise direction of the contact plane with a flat plate in the conditions in which a pneumatic tire is mounted on an applicable rim, under a predetermined air pressure and a load corresponding to a predetermined mass, with its equatorial plane tilted at from −50° to +50° in relation to the flat plate in a stationary state. The tread surface refers to the contact plane described above. Furthermore, "Wt, a length between the tread ground-contact ends in the cross section in the tire widthwise direction" refers to a length measured along the tread surface. Also, the "length between the tread ground-contact end–widthwise outermost end of the cushion" refers to a length between the foot of a perpendicular coming down from the tread ground-contact end to the cushion rubber and the widthwise outermost end of the cushion, the length being measured along the cushion rubber.

In the aforementioned pneumatic tire for a motorcycle, modulus of the cushion rubbers (hereinafter, "kc") may be 50% or more and 95% or less of a modulus of the base rubber (hereinafter, "kb"). Defining the kc and the kb as in the range described above can suppress separation between the cushion rubbers and the base rubber as well as to secure the aforementioned effect according to the cushion rubbers.

Advantageous Effects of Invention

The pneumatic tire for a motorcycle according to the present invention can secure durability of a tire as well as can improve grip performance in turning of a tire.

DESCRIPTION OF EMBODIMENTS

Hereinafter, the embodiment of the pneumatic tire for a motorcycle according to the present invention will be described and illustrated in details with reference to the drawings.

Figure 1:
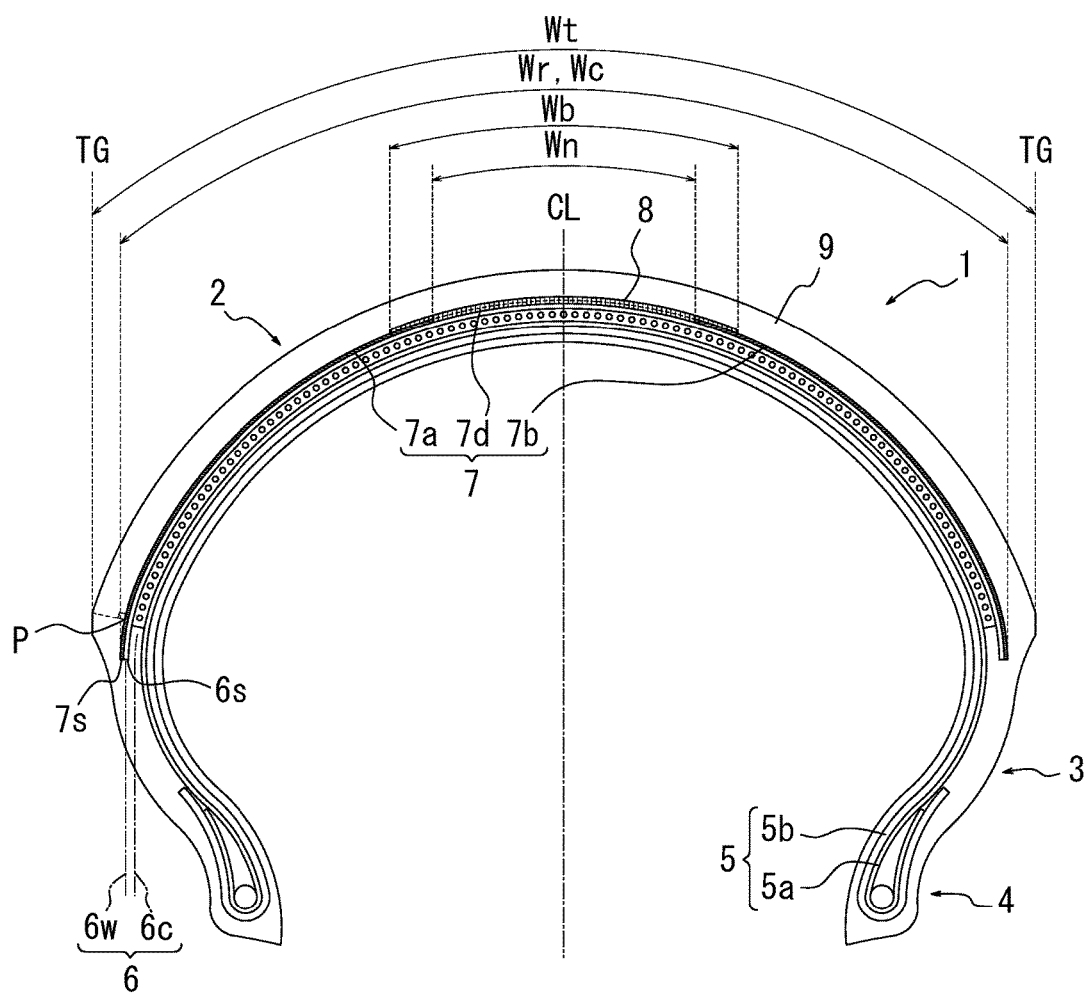
FIG. 1 is a cross-sectional view in the tire widthwise direction illustrating a pneumatic tire according to one embodiment of the present invention.

FIG. 1 is a cross-sectional view of a tread in the tire widthwise direction of the pneumatic tire according to one embodiment of the present invention. The pneumatic tire according to one embodiment of the present invention (hereinafter, pneumatic tire 1) comprises a tread 2, a pair of sidewall portions 3 each extending from the side portions of the tread 2 inward in the tire radial direction, respectively, and a pair of bead portions 4 each extending from the sidewall portion 3 inward in the tire radial direction, respectively.

Furthermore, pneumatic tire 1 comprises a radial carcass 5 (5a and 5b in FIG. 1) that is composed of two plies each extending in a toroidal shape across the pair of bead portions 4, respectively.

It should be noted herein that FIG. 1 illustrates a radial carcass 5, the ply number of which is two, however, the ply number may be one or plural numbers more than three as necessary in the pneumatic tire for a motorcycle according to the present invention. FIG. 1 illustrates a radial carcass as a carcass of a tire, however, a bias carcass may be employed as a carcass of a tire in the pneumatic tire for a motorcycle according to the present invention.

Figure 2:
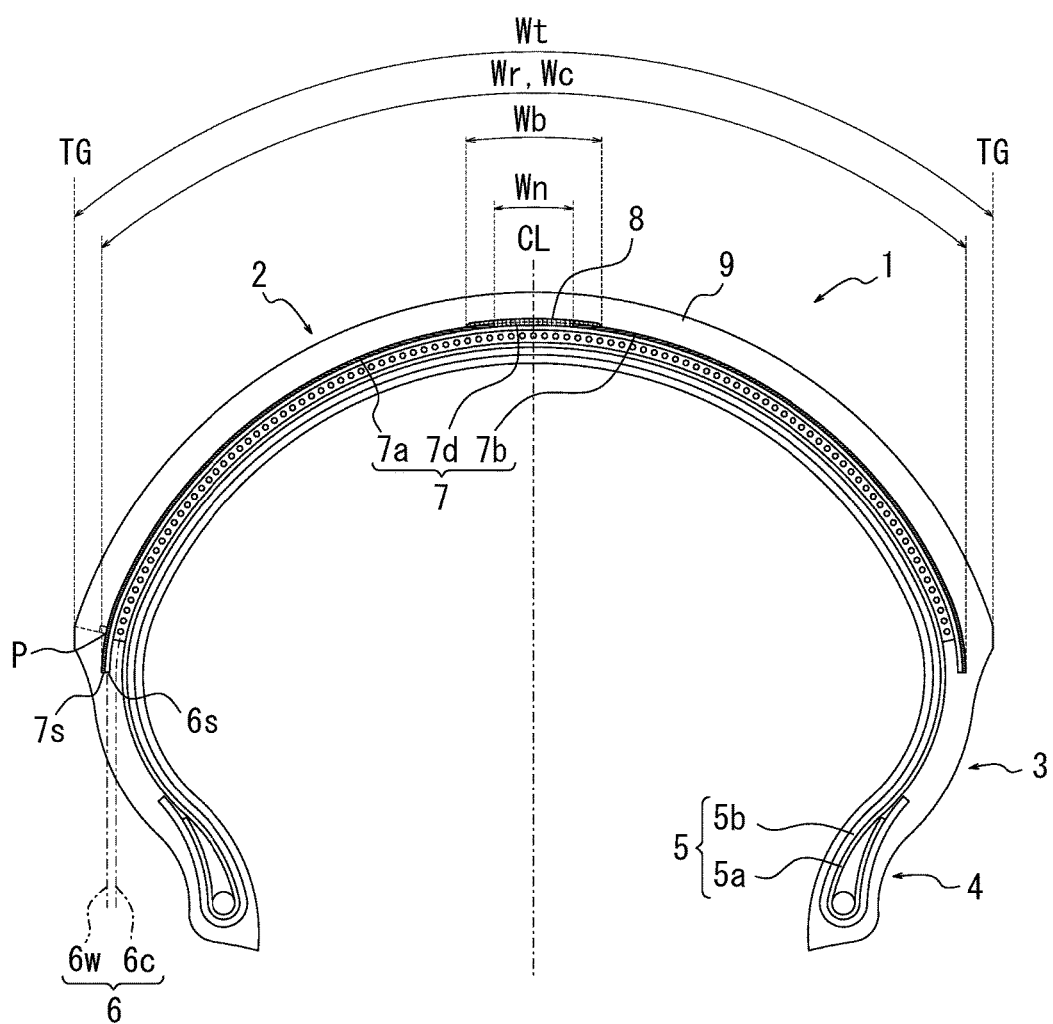
FIG. 2 is a cross-sectional view in the tire widthwise direction illustrating a pneumatic tire according to another embodiment of the present invention.
Figure 3:
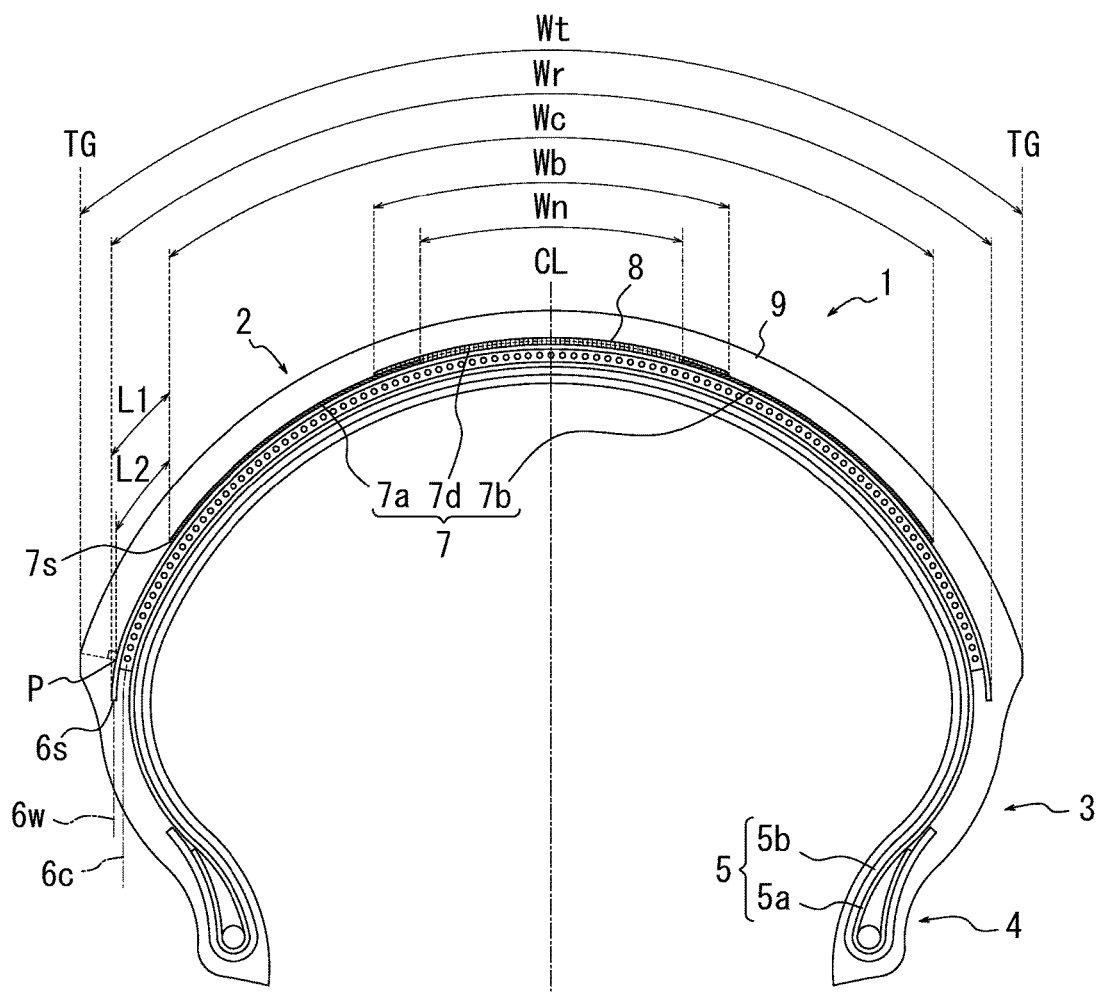
FIG. 3 is a cross-sectional view in the tire widthwise direction illustrating a pneumatic tire according to the other embodiment of the present invention.
Figure 4:
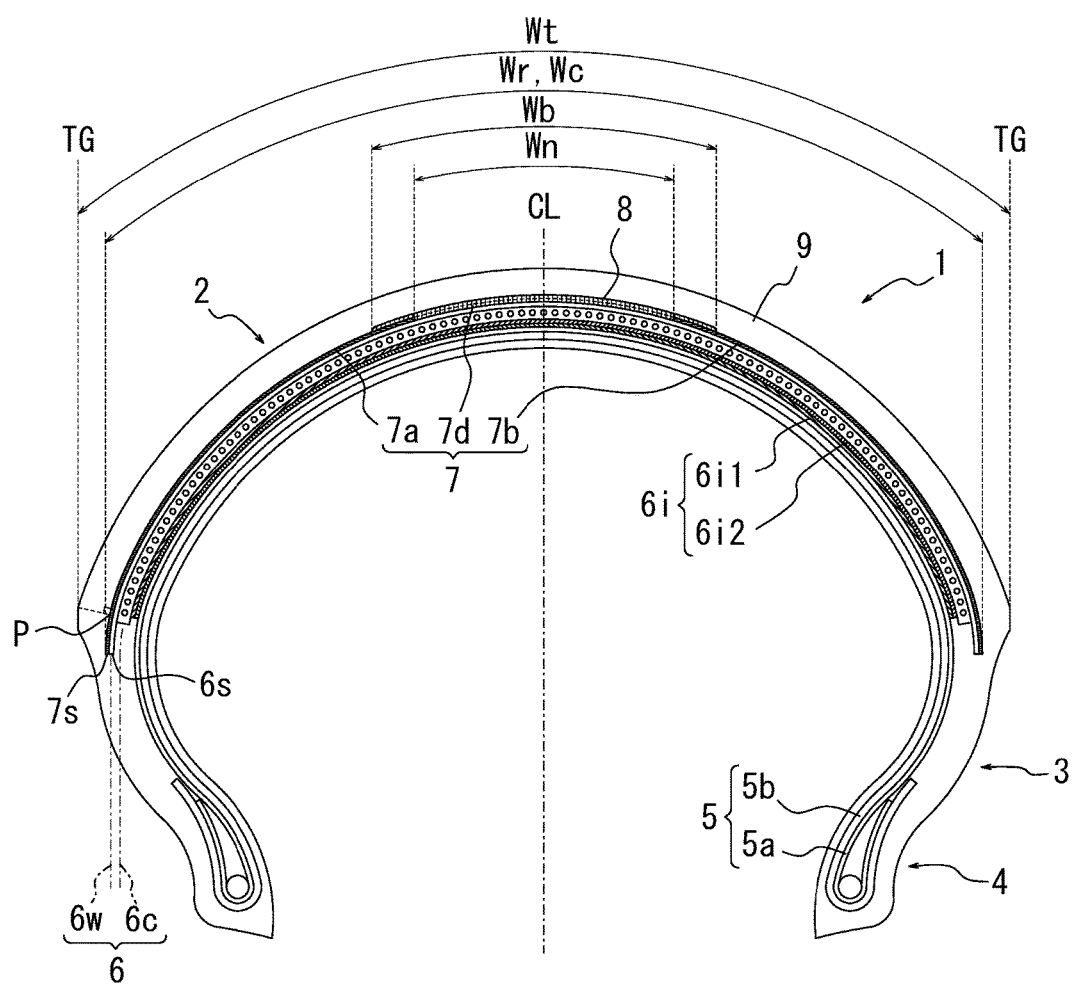
FIG. 4 is a cross-sectional view in the tire widthwise direction illustrating a pneumatic tire according to the still other embodiment of the present invention.

FIGS. 2, 3, and 4 illustrate tires according to different embodiments of the invention. Hereinafter, elements the same as those illustrated in FIG. 1 are to be indicated using references identical with those for the pneumatic tire according to one embodiment of the present invention illustrated in FIG. 1.

Pneumatic tire 1 comprises a belt 6 consisting of circumferential belt layer 6c formed by coating a plurality of cords aligned in parallel to each other and extending in the tread circumferential direction with rubber, and a widthwise belt layer 6w formed by coating a plurality of cords aligned in parallel to each other and extending in the tire widthwise direction with rubber, the widthwise belt layer 6w located outward in the tire radial direction from the circumferential belt layer 6c.

It should be noted herein that, the phrase "extending in the tread circumferential direction" does not refer to extending exactly in the direction parallel to a tread circumferential line, but refers to extending in the direction containing the tread circumferential direction component. Therefore, the cords that configure the circumferential belt layers 6c are not necessarily extending in the tread circumferential direction in the strict sense, but may be extending in a direction inclined at, for instance, from 10° to 80° in relation to the tread circumferential direction. Similarly, the phrase "extending in the tire widthwise direction" does not refer to extending exactly in the tire widthwise direction in parallel to the tire widthwise direction, but refers to extending in the direction containing the tire widthwise direction component.

Therefore, the cords that configure the widthwise belt layers 6*w* are not necessarily extending in the tire widthwise direction in the strict sense, but may be extending in a direction inclined at, for instance, from 70° to 90° in relation to the tread circumferential direction.

In pneumatic tire 1, the belt 6 consists of the circumferential belt layer 6*c* and the widthwise belt layer 6*w*, however as shown in FIG. 4, in the pneumatic tire for a motorcycle according to the present invention, it may further comprise a cross belt layer 6*i* between a radial carcass ply 5 and the circumferential belt layer 6*c*, the cross belt layer 6*i* consisting of two layers of inclined belt layers 6*i*1, 6*i*2 each formed by coating a plurality of cords aligned in parallel to each other and extending inclined in relation to the tread circumferential line with rubber.

As shown in FIG. 1, the tread 2 is provided with cushion rubbers 7*a*, 7*b* located outward in the tire radial direction from the belt 6. The cushion rubbers 7*a*, 7*b* are extending from one outer side to the other outer side in the tire widthwise direction, however, these are not placed in a given region including the tire equatorial plane CL. In other words, the two-membered cushion rubbers 7*a*, 7*b* are placed in the locations separated from each other in the tire widthwise direction in both sides of the tire equatorial plane CL.

Furthermore, the tread 2 is provided with a base rubber 8 having a modulus higher than that of the cushion rubber 7 located in the separated region where the cushion rubbers 7*a*, 7*b* are separated (the cushion rubber separated region) 7*d* and outward in the tire radial direction from the region 7*d*.

It should be noted herein that in the pneumatic tire for a motorcycle according to the present invention, the base rubber may be placed in the cushion rubber separated region or outward in the tire radial direction therefrom.

Furthermore, the tire tread 2 is provided with, a cap rubber 9 located outward in the tire radial direction from the cushion rubbers 7*a*, 7*b* and the base rubber 8.

In pneumatic tire 1 according to one embodiment of the present invention, it is necessary that Wn, the cushion rubber separation length and Wb, a length of the base rubber satisfy the relation: Wn≤Wb.

Motorcycles run faster when tires are standing-up compared with when tires are tilted. Therefore, the center side region including tire equatorial plane that contacts to the ground when tires are standing-up tends to have repetitive strain and thus tends to have increased heat generation in the tread to cause heat storage therein.

In pneumatic tire 1, the cushion rubbers 7*a*, 7*b* having a modulus lower than that of the base rubber are not placed in the center side region (including the tire equatorial plane CL). Therefore, amount of deformation in the center side region can be reduced compared with that of a virtual tire provided with the cushion rubbers 7*a*, 7*b* all over the tread region in the tire widthwise direction, which can suppress an increase in the amount of heat generation in the center side region. Furthermore the base rubber 8 having lower heat generation property and a higher modulus than those of the cushion rubbers is placed in the center side region where no cushion rubbers 7*a*, 7*b* are placed. Accordingly pneumatic tire 1 can further suppress an increase in the amount of heat generation in this region, which can secure durability of a tire.

The effect by virtue of the cushion rubbers is obtainable in the shoulder side regions. That is, increasing shear deformation which occurs in the rubber placed between the belt having large rigidity and the tread surface can improve grip performance in turning of a tire.

Furthermore, placing the base rubber 8 in the cushion rubber separated region 7*d* and outward in the tire radial direction from the region 7*d*, can further suppress an increase in the amount of heat generation in the center side region, which further secures durability of a tire.

In this connection, when Wn/Wb exceeds 1.0, the tread has a region that is not provided with the base rubber outward in the tire radial direction from the cushion rubber separated region 7*d*. Therefore, the effect of suppressing heat generation in the above center side region may not be sufficient.

According to the finding of the inventors, pneumatic tire 1 provided with the belt comprising the circumferential belt layer and the widthwise belt layer (hereinafter, also "double-belt structure"), has a plurality of cord layers laminated in the tire radial direction, thus tends to store heat that generates in the tread. In particular, the center side region in the tread has higher heat storage property compared with the shoulder side regions.

Accordingly, the effects of the present invention, securing durability of a tire and improving grip performance in turning of a tire, obtainable in the tire satisfying the relation: Wn≤Wb can be high in pneumatic tire 1 according to one embodiment of the present invention.

Furthermore, in pneumatic tire 1, Wn and Wb preferably satisfy the relation: 0.2≤Wn/Wb≤0.8.

Defining Wn/Wb as 0.2 or more can secure improvement in grip performance in turning of a tire. Also, it can reduce the cushion rubbers to be provided in the center side region to suppress an increase in the amount of heat generation in the center side region, whereby the effect of securing durability of a tire is readily obtainable. In addition, Defining Wn/Wb as 0.8 or less can allow the base rubber having lower heat generation property to sufficiently cover the cushion rubber separated region to easily secure suppression of an increase in the amount of heat generation in the center side region, whereby durability of a tire can be secured For the same reason as the aforementioned, Wn/Wb more preferably satisfy the relation: 0.4≤Wn/Wb≤0.6.

It should be noted herein that, the pneumatic tire according to one embodiment shown in FIG. 1 satisfies the relation: 0.2≤Wn/Wb≤0.8, whereas the pneumatic tire according to another embodiment shown in FIG. 2 satisfies the relation: Wn/Wb<0.2.

Furthermore, in the pneumatic tire according to the other embodiment of the present invention as shown in FIG. 3, L1, a length between widthwise outermost end of the belt 6*s* and widthwise outermost end of the cushion 7*s*, namely, the length between the widthwise outermost end of the belt–the widthwise outermost end of the cushion (shown in one outward side in the tire widthwise direction in FIG. 3) is preferably 0.1 Wr or less, where Wr is a length between the widthwise outermost ends of the belt 6*s*, namely the length of the belt 6.

Defining the L1, the length between the widthwise outermost end of the belt–the widthwise outermost end of the cushion as 0.1 Wr or less can allow the cushion rubbers having relatively low modulus to reach up to an outer side in the tire widthwise direction. Therefore, it can improve the ground-contact property of a tire when a vehicle with these tires is in turn to further improve grip performance in turning of a tire.

For the same reason as the aforementioned, the L1 more preferably satisfies 0≤L1≤0.05 Wr.

It should be noted herein that, the pneumatic tire according to the other embodiment shown in FIG. 3 has the widthwise outermost end of the belt 6*s* positioned outward in the extending direction thereof in relation to the widthwise outermost end of the cushion 7s, whereas both in the pneumatic tires according to one embodiment shown in FIG. 1 and another embodiment shown in FIG. 2, the widthwise outermost end of the belt 6s is positioned inward in the extending direction thereof in relation to the widthwise outermost end of the cushion 7s.

However, both cases in FIGS. 1 and 2 allows the cushion rubbers to reach up to the outer side in the tire widthwise direction, the same effect as in the case defining the L1 as 0.1 Wr or less is obtainable.

Furthermore, in the pneumatic tire according to the other embodiment of the present invention as shown in FIG. 3, L2, a length between the foot of a perpendicular P coming down from the tread ground-contact end TG to the cushion rubber 7a and the widthwise outermost end of the cushion 7s, namely, the length between the tread ground-contact end–widthwise outermost end of the cushion (shown in one outward side in the tire widthwise direction in FIG. 3) is preferably 0.1 Wt or less.

Defining the L2, the length between the tread ground-contact end–the widthwise outermost end of the cushion as 0.1 Wt or less can allow the cushion rubbers having relatively low modulus to reach up to the outer side in the tire widthwise direction. Therefore, it can improve tire ground-contact property when the vehicle with the tires is in turn to further improve grip performance in turning of a tire.

For the same reason as the aforementioned, the L2 more preferably satisfies the relation: 0≤L2≤0.05 Wt.

It should be noted herein that the pneumatic tire according to the other embodiment shown in FIG. 3 has the foot of a perpendicular P positioned outward in the extending direction thereof in relation to the widthwise outermost end of the cushion 7s, whereas both in the pneumatic tires according to one embodiment shown in FIG. 1 and another embodiment shown in FIG. 2, the foot of a perpendicular P is positioned inward in the extending direction thereof in relation to the widthwise outermost end of the cushion 7s.

However, both cases in FIGS. 1 and 2 allows the cushion rubbers to reach up to the outer side in the tire widthwise direction, the same effect as in the case defining the L2 as 0.1 Wt or less is obtainable.

When a length of a region combining the region provided with the cushion rubbers 7a, 7b and the cushion rubber separated region 7d (hereinafter, also "cushion layer region") 7 is referred to as Wc, the pneumatic tire 1 according to one embodiment preferably satisfies the relation: Wb<Wc.

Defining Wb, the length of the base rubber 8 having a higher modulus as being shorter than Wc, the length of the cushion layer region 7 that contains the cushion rubbers 7a, 7b having lower modulus can easily secure the effect obtainable by virtue of the cushion rubbers. That is, it is possible to increase shear deformation of rubber which occurs between the belt with larger rigidity and the tread surface, whereby the effect of improving grip performance in turning of a tire is readily obtainable.

Furthermore, in pneumatic tire 1, the modulus of the cushion rubbers 7a, 7b (kc) are preferably 50% or more and 95% or less of the modulus of the base rubber 8 (kb).

Defining the kc as being 50% or more of the kb can suppress separation between the cushion rubbers and the base rubber caused by an input from the ground to the tire. Defining the kc as being 95% or less of the kb can secure the above effect obtainable by virtue of the cushion rubbers.

And for the same reason as the aforementioned, the kc are more preferably 60% or more and 75% or less of the kb.

It should be noted herein that one sheet of a base rubber member having a predetermined thickness may also be used in the pneumatic tire for a motorcycle according to the present invention and the pneumatic tire may be configured in such a manner that a part of the base rubber is inserted into the cushion rubber separated region. By virtue of the configuration aforementioned, the pneumatic tire for a motorcycle according to the present invention can be readily manufactured.

Furthermore, in the pneumatic tire for a motorcycle according to the present invention, the rubber provided in the cushion rubber separated region is not limited to the base rubber but may be other rubber members.

A rubber thickness Db of the base rubber 8 is preferably 1.0 mm or more and 5.0 mm or less. Defining the Db as 1.0 mm or more can further suppress an increase in the amount of heat generation in the center side region to secure durability of a tire. In addition, Defining the Db as 5.0 mm or less can suppress an increase in shearing rigidity the center side region to secure grip performance of a tire. It should be noted herein that, the term "rubber thickness" refers to the maximum width in the tire radial direction of the rubber.

A rubber thickness Dc of the cushion rubbers 7a, 7b is preferably 0.1 mm or more and 1.0 mm or less, respectively. Defining the Dc as 0.1 mm or more can easily increase shear deformation in the tread to secure the effect of improving grip performance in turning of a tire. Defining the Dc as 1.0 mm or less can suppress deformation of cushion rubber to suppress heat generation in the center side region. Accordingly, it can suppress rubber deterioration caused by heat to further secure durability of a tire.

It should be noted herein that, the radial carcass 5 (5a and 5b) of pneumatic tire 1 is formed by coating a plurality of ply cords with rubber, the ply cords aligned inclined in relation to the tread circumferential direction at a predetermined angle, for instance at from 70° to 90°. Cords for the radial carcass are, for example, textile cords (synthetic fiber cords) having relatively high modulus.

In addition, cords for the circumferential belt layer 6c may extend along the tread circumferential line in a given shape such as linear, zigzag, wavy and other shapes. Also, the cords may extend inclined in relation to the tread circumferential direction at a predetermined angle, for instance at from 0° to 5° and extend in a spiral manner in relation to the tire widthwise direction. Cords for the circumferential belt layer 6c are, for example, nylon fiber cords, aromatic polyamide fiber cords (for instance, Kevlar®), steel cords and other cords, preferably steel cords in particular.

Furthermore, cords for the widthwise belt layer 6w may extend along the tire widthwise direction in a given shape such as linear, zigzag, wavy and other shapes. Cords for the widthwise belt layer 6w are, for example, nylon fiber cords, aromatic polyamide fiber cords, steel cords and other cords, preferably aromatic polyamide fiber cords in particular.

Furthermore, cords for the inclined belt layers 6i1 and 6i2 contained in the cross belt layer 6i may extend in a given shape such as linear, zigzag, wavy and other shapes. Also, these cords are formed by coating a plurality of cords with rubber, the cords aligned inclined to the tread circumferential direction at a predetermined angle, for instance at 60°~90°. Cords for the inclined belt layers 6i1 and 6i2 are, for example, nylon fiber cords, aromatic polyamide fiber cords, steel cords and other cords, preferably aromatic polyamide fiber cords in particular.

For instance, the cross belt layer is configured in such a manner that the cords of the inclined belt layer 6i1 and the cords of the inclined belt layer 6i2 are inclined towards the opposite direction in relation to the tread circumferential direction.

EXAMPLES

Hereinafter, the present invention will now be described in more detail with reference to examples, however, the present invention is not in any way limited to the examples described below.

Example 1

A pneumatic tire having the specifications shown in Table 1 was experimentally manufactured. The manufactured pneumatic tire was served to the following evaluation.

Comparative Example 1

A pneumatic tire having the specifications shown in Table 1 was experimentally manufactured. The manufactured pneumatic tire was served to the following evaluation the same as Example 1.

A tire for a motorcycle (190/650R17) was mounted on an applicable rim (6.00) as defined according to the JATMA standard to manufacture a rim-assembled tire (hereinafter, "in-use tire 1"). In addition, a tire for a motorcycle (120/600R17) was mounted on an applicable rim (3.50) as defined according to the JATMA standard to manufacture a rim-assembled tire (hereinafter, "in-use tire 2").

(1) (Durability test) Each of the above in-use tire 1 and in-use tire 2 ran at a gradually increasing speed on a drum testing device under the conditions of a predetermined air pressure and load. The speed was observed when a tire has broken down. Specifically, the index in relative evaluation was calculated with the evaluation result of the Comparative Example 1 being a score of 100. The results thereof are shown in Table 1. The larger the index is, the higher the speed at the breakdown of a tire is, which indicates higher durability of a tire.

(2) (Grip performance test) The above in-use tire 1 was mounted on a front wheel and the above in-use tire 2 was mounted on a rear wheel of a racing motorcycle under the conditions the same as in the durability test. And the test driver drove the motorcycle in a variety of motions to provide the feeling evaluation. Specifically, the index in relative evaluation was calculated with the evaluation result of the Comparative Example 1 being a score of 100. The results thereof are shown in Table 1. The larger the index is, the higher the feeling evaluation score is, which indicates higher grip performance in turning of a tire.

Examples 2~10

Pneumatic tires having the specifications shown in Table 1 were experimentally manufactured. The manufactured tires are served to evaluation described above the same as Example 1, except that the manufactured tires herein were used. Detailed experimental conditions are shown in Table. 1

TABLE 1

| Tire specifications | | | | Comparative Example 1 | Example 1 | Example 2 | Example 3 | Example 4 | Example 5 |
|---|---|---|---|---|---|---|---|---|---|
| Tire specifications | | Tire construction | | — | FIG. 2 | FIG. 2 | FIG. 1 | FIG. 1 | FIG. 1 |
| | Carcass ply | | Carcass construction | Radial | Radial | Radial | Radial | Radial | Radial |
| | | | Number of ply | 2 | 2 | 2 | 2 | 2 | 2 |
| | | | Material of cords | Nylon | Nylon | Nylon | Nylon | Nylon | Nylon |
| | | | Cord angle in relation to tread circumferential direction (°) | 80 | 80 | 80 | 80 | 80 | 80 |
| | Cross belt layer | Inclined belt layer 1 | Number of ply | — | — | — | — | — | — |
| | | | Material of cords | — | — | — | — | — | — |
| | | | Cord angle in relation to tread circumferential direction (°) | — | — | — | — | — | — |
| | | Inclined belt layer 2 | Number of ply | — | — | — | — | — | — |
| | | | Material of cords | — | — | — | — | — | — |
| | | | Cord angle in relation to tread circumferential direction (°) | — | — | — | — | — | — |
| | Circumferential belt layer | | Number of ply | 1 | 1 | 1 | 1 | 1 | 1 |
| | | | Material of cords | Steel | Steel | Steel | Steel | Steel | Steel |
| | | | Cord angle in relation to tread circumferential direction (°) | 0 | 0 | 0 | 0 | 0 | 0 |
| | Widthwise belt layer | | Number of ply | 1 | 1 | 1 | 1 | 1 | 1 |
| | | | Material of cords | Aromatic polyamide | Aromatic polyamide | Aromatic polyamide | Aromatic polyamide | Aromatic polyamide | Aromatic polyamide |
| | | | Cord angle in relation to tread circumferential direction (°) | 90 | 90 | 90 | 90 | 90 | 90 |
| | Tire parameters | | Wn/Wb | 0 | 0.05 | 0.05 | 0.3 | 0.5 | 0.3 |
| | | | L1/Wr | — | 0.2 | 0.05 | 0.5 | 0.2 | 0.05 |
| | | | L2/Wt | — | 0.2 | 0.05 | 0.5 | 0.2 | 0.5 |
| | | | ka/kb | — | 0.85 | 0.85 | 0.7 | 0.85 | 0.7 |
| Tire performance test | | | Durability | 100 | 100 | 105 | 110 | 120 | 110 |
| | | | Grip performance | 100 | 115 | 120 | 105 | 115 | 105 |

TABLE 1-continued

| Tire specifications | | | Example 6 | Example 7 | Example 8 | Example 9 | Example 10 |
|---|---|---|---|---|---|---|---|
| Tire | Tire construction | | FIG. 1 | FIG. 1 | FIG. 1 | FIG. 3 | FIG. 4 |
| | Carcass ply | Carcass construction | Radial | Radial | Radial | Radial | Radial |
| | | Number of ply | 2 | 2 | 2 | 2 | 2 |
| | | Material of cords | Nylon | Nylon | Nylon | Nylon | Nylon |
| | | Cord angle in relation to tread circumferential direction (°) | 80 | 80 | 80 | 80 | 80 |
| | Cross belt layer — Inclined belt layer 1 | Number of ply | — | — | — | — | 1 |
| | | Material of cords | — | — | — | — | Aromatic polyamide |
| | | Cord angle in relation to tread circumferential direction (°) | — | — | — | — | 75 |
| | Inclined belt layer 2 | Number of ply | — | — | — | — | 1 |
| | | Material of cords | — | — | — | — | Aromatic polyamide |
| | | Cord angle in relation to tread circumferential direction (°) | — | — | — | — | 75 |
| | Circumferential belt layer | Number of ply | 1 | 1 | 1 | 1 | 1 |
| | | Material of cords | Steel | Steel | Steel | Steel | Steel |
| | | Cord angle in relation to tread circumferential direction (°) | 0 | 0 | 0 | 0 | 0 |
| | Widthwise belt layer | Number of ply | 1 | 1 | 1 | 1 | 1 |
| | | Material of cords | Aromatic polyamide | Aromatic polyamide | Aromatic polyamide | Aromatic polyamide | Aromatic polyamide |
| | | Cord angle in relation to tread circumferential direction (°) | 90 | 90 | 90 | 90 | 90 |
| Tire parameters | | Wn/Wb | 0.5 | 0.3 | 0.3 | 0.5 | 0.5 |
| | | L1/Wr | 0.05 | 0.05 | 0.05 | 0.05 | 0.05 |
| | | L2/Wt | 0.5 | 0.05 | 0.05 | 0.05 | 0.05 |
| | | ka/kb | 0.95 | 0.4 | 0.85 | 0.7 | 0.7 |
| Tire performance test | | Durability | 120 | 100 | 110 | 120 | 120 |
| | | Grip performance | 105 | 130 | 120 | 125 | 120 |

INDUSTRIAL APPLICABILITY

The pneumatic tire for a motorcycle according to the present invention can secure durability of a tire as well as can improve grip performance in turning of a tire.

This pneumatic tire for a motorcycle can be preferably used for a front wheel and/or a rear wheel, in particular a rear wheel, of a motorcycle running on a dry road surface.

The invention claimed is:

1. A pneumatic motorcycle tire comprising a belt containing a belt layer formed by coating a plurality of cords with rubber in a tire tread, wherein the tread includes:
cushion rubbers separated from each other in the tire widthwise direction in both sides of the tire equatorial plane by a separated region, the cushion rubbers located outward in the tire radial direction from and adjacently to the belt;
a base rubber provided outward in the tire radial direction from the separated region to cover the separated region and having a modulus higher than those of the cushion rubbers, the base rubber located in the separated region to fill the separated region and to contact the belt, located adjacently to the belt and located outward in the tire radial direction from and adjacently to the cushion rubbers; and
a cap rubber located outward in the tire radial direction from and adjacently to the cushion rubbers and outward in the tire radial direction from and adjacently to the base rubber, the cap rubber completely covering the cushion rubbers and the base rubber, and
wherein:
Wn, a length of the separated region, and Wb, a length of the base rubber in the cross section in the tire widthwise direction, satisfy the relation: Wn≤Wb,
a modulus of the cushion rubbers is 50% or more and 95% or less of a modulus of the base rubber,
the cushion rubbers, the base rubber and cap rubber are discrete from one another, and
outer ends of the cushion rubbers in the tire width direction are provided closer to the rotating axis of the pneumatic motorcycle tire in the tire radial direction than ground contact ends of the pneumatic motorcycle tire, and
a rubber thickness Dc of the cushion rubbers is 0.1 mm≤Dc≤0.7 mm.

2. The pneumatic motorcycle tire according to claim 1, wherein the Wn and the Wb satisfy the relation: 0.2≤Wn/Wb≤0.8.

3. The pneumatic motorcycle tire according to claim 1, wherein a length between the outermost end of the belt in the tire widthwise direction and the outermost end of one of the cushion rubbers in the tire widthwise direction is 0.1 Wr or less, where Wr is a length of the belt, in a cross section in the tire widthwise direction.

4. The pneumatic motorcycle tire according to claim 1, wherein a length between the tread ground-contact end and the outermost end of the cushion rubber in the tire widthwise direction is 0.1 Wt or less, where Wt is a length between the tread ground-contact ends, in a cross section in the tire widthwise direction.

5. The pneumatic motorcycle tire according to claim 1, wherein a rubber thickness $D_c$ of the cushion rubbers is 0.1 mm≤Dc≤0.5 mm.

\* \* \* \* \*